United States Patent
Hu et al.

(10) Patent No.: US 9,370,056 B2
(45) Date of Patent: Jun. 14, 2016

(54) DRIVING APPARATUS AND METHOD FOR DIMMABLE LED

(71) Applicant: Shenzhen China Star Optoelectronics Technology Co., Ltd., Shenzhen (CN)

(72) Inventors: Anle Hu, Shenzhen (CN); Xiang Yang, Shenzhen (CN); Hua Zhang, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 13/813,450

(22) PCT Filed: Jan. 22, 2013

(86) PCT No.: PCT/CN2013/070857
§ 371 (c)(1),
(2) Date: Jan. 31, 2013

(87) PCT Pub. No.: WO2014/110840
PCT Pub. Date: Jul. 24, 2014

(65) Prior Publication Data
US 2015/0312980 A1    Oct. 29, 2015

(30) Foreign Application Priority Data
Jan. 18, 2013 (CN) .......................... 2013 1 0019904

(51) Int. Cl.
*H05B 33/08* (2006.01)
*H05B 37/02* (2006.01)
*H02M 3/156* (2006.01)
*H05B 39/00* (2006.01)

(52) U.S. Cl.
CPC .......... *H05B 33/0812* (2013.01); *H05B 33/083* (2013.01); *H05B 33/0815* (2013.01); *H05B 33/0845* (2013.01); *Y02B 20/346* (2013.01); *Y02B 20/347* (2013.01)

(58) Field of Classification Search
CPC ............. H05B 33/0815; H05B 33/083; H05B 33/0845; H05B 33/0851; H05B 33/089; H05B 37/02; Y02B 20/346; Y02B 20/347; H02M 3/156
USPC .......... 315/186, 185 R, 291, 224, 307, 209 R, 315/200 R; 345/102; 323/282, 277
See application file for complete search history.

(56) References Cited

U.S. PATENT DOCUMENTS

| | | | | |
|---|---|---|---|---|
| 2007/0280314 A1* | 12/2007 | Keh | ..................... | H01S 5/06808 372/38.02 |
| 2007/0285031 A1* | 12/2007 | Shteynberg | ........... | H02M 3/157 315/294 |
| 2011/0227493 A1* | 9/2011 | Du | ..................... | H05B 33/0848 315/192 |

*Primary Examiner* — Alexander H Taningco
*Assistant Examiner* — Christian L Garcia
(74) *Attorney, Agent, or Firm* — Mark M. Friedman

(57) ABSTRACT

A driving apparatus and method for a dimmable LED is provided. The apparatus includes a dimmer switch which controls connection or disconnection of an LED series. The apparatus further includes: a boost circuit electrically coupled to the LED series; a comparator electrically coupled to the boost circuit, the comparator receiving a triangle wave signal to generate a PWM signal, the PWM signal controlling the boost circuit; and a RC circuit electrically coupled to the comparator, the RC circuit utilized to output a charging curve signal to the comparator when the dimmer switch disconnects, thereby improving noise and electromagnetic interference of the boost circuit.

8 Claims, 5 Drawing Sheets

DRIVING APPARATUS AND METHOD FOR DIMMABLE LED

FIELD OF THE INVENTION

The present invention relates to a light-emitting diode (LED) technology, and especially to a driving apparatus and a method for a dimmable LED.

BACKGROUND OF THE INVENTION

Referring to FIG. 1, FIG. 1 is a block diagram illustrating a prior art dimmable LED driving circuit. As shown in the drawing, the driving principle thereof is mainly as follows. A voltage source 10 provides a working voltage to an LED series 20, which is coupled to a switching circuit 30, and then connected to a current detector 40 in series.

Furthermore, the current detector 40 is a resistor generally; a current value can be detected through a voltage drop that the current passes through the resistor. The current detector 40 is coupled to a comparison circuit 50, so that the voltage obtained by the current detector 40 can be compared with a triangle wave 42. When the voltage of triangle wave 42 is larger than the voltage obtained by the current detector 40, the comparison circuit 50 outputs a high-level signal; otherwise, the comparison circuit 50 outputs a low-level signal. Accordingly, a Pulse Width Modulation (PWM) signal 52 is generated for controlling connection or disconnection of the switching circuit 30. A lighting duration of the LED series 20 can be controlled through changing a duty cycle of the PWM signal 52, and a brightness of the LED series 20 can be controlled by a length of the lighting duration.

At present, there is often a light dimming demand for changing the brightness of the LED. One of the common ways is to use a variable resistor as the current detector 40. By means of changing a resistance value of the variable resistor, the voltage obtained by the current detector 40 in the same current may decrease or increase, and the duty cycle can be decreased or increased by the voltage via the comparison circuit 50, thereby changing the brightness of the LED series 20. Another way is to alter amplitude of the triangle wave 42, and the duty cycle also can be changed under condition of a constant resistance value, thereby achieving the objective of the light dimming.

However, when a switch Q2 in the switching circuit 30 disconnects instantly, a gate signal GATE, which is received by a field effect transistor Q1 in the voltage source 10 that is implemented by a boost circuit, is at a low level. Meanwhile, the LED series 20 goes out, so that the current passing through an inductor L is sharply decreased, thus resulting in a shake of a core of the inductor L to cause a larger noise. At the same time, the voltage source 10 makes large electromagnetic interference.

SUMMARY OF THE INVENTION

An objective of the present invention is to provide a dimmable LED driving apparatus, which can solve the problem that the noise and the electromagnetic interference are generated when the LED series goes out in the prior art.

Another objective of the present invention is to provide a dimmable LED driving method, which can solve the problem that the noise and the electromagnetic interference are generated when the LED series goes out.

To achieve the foregoing objective, a preferred embodiment of the present invention provides a dimmable LED driving apparatus, which includes a dimmer switch. The dimmer switch controls connection or disconnection of an LED series. The dimmable LED driving apparatus further includes: a boost circuit electrically coupled to the LED series; a comparator electrically coupled to the boost circuit, the comparator receiving a triangle wave signal to generate a Pulse Width Modulation (PWM) signal, the PWM signal controlling the boost circuit; and a resistor-capacitor (RC) circuit electrically coupled to the comparator, the RC circuit utilized to output a charging curve signal to the comparator when the dimmer switch disconnects. More specifically, the comparator generates the PWM signal with the diminishing duty cycles by comparing the charging curve signal and the triangle wave signal.

In the dimmable LED driving apparatus of the preferred embodiment of the present invention, the dimmable LED driving apparatus further includes a switching circuit, which is utilized to turn on a connection between the RC circuit and the comparator when the dimmer switch disconnects, so that the comparator receives the charging curve signal. Specifically, the switching circuit is utilized to turn off the connection between the RC circuit and the comparator when the dimmer switch connects In the preferred embodiment, the dimmable LED driving apparatus further comprises a feedback circuit, and the feedback circuit is utilized to couple the LED series to the comparator. More specifically, the RC circuit and the feedback circuit are coupled to a same input terminal of the comparator. Moreover, when the switching circuit turns off the connection between the RC circuit and the comparator, the switching circuit connects the feedback circuit.

In the dimmable LED driving apparatus of the preferred embodiment of the present invention, the RC circuit includes a capacitor and a resistor. One terminal of the capacitor is grounded; an opposite terminal thereof is coupled to the comparator. The resistor is connected parallel to the capacitor. Moreover, the dimmable LED driving apparatus further comprises a voltage source, and the voltage source is utilized to charge the capacitor.

Another preferred embodiment of the present invention provides a driving method for a dimmable LED. The method for driving a dimmable LED includes a step of: outputting a charging curve signal to a comparator for the comparator to generate a PWM signal with diminishing duty cycles when a dimmer switch disconnects an LED series.

In comparison with the prior art, when the dimmer switch disconnects, the present invention additionally provides a charging curve signal to the comparator for comparing with the triangle wave, so that the PWM signal that controls the boost circuit does not become the low level immediately. On the contrary, the boost circuit is driven in several cycles by the PWM signal with the diminishing duty cycles, so that the current of the inductor in the boost circuit decreases slowly, and the switch in the boost circuit is then turned off. Therefore, the driving apparatus and method for a dimmable LED of the present invention can solve the problem that the noise and the electromagnetic interference are generated when the LED series goes out.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
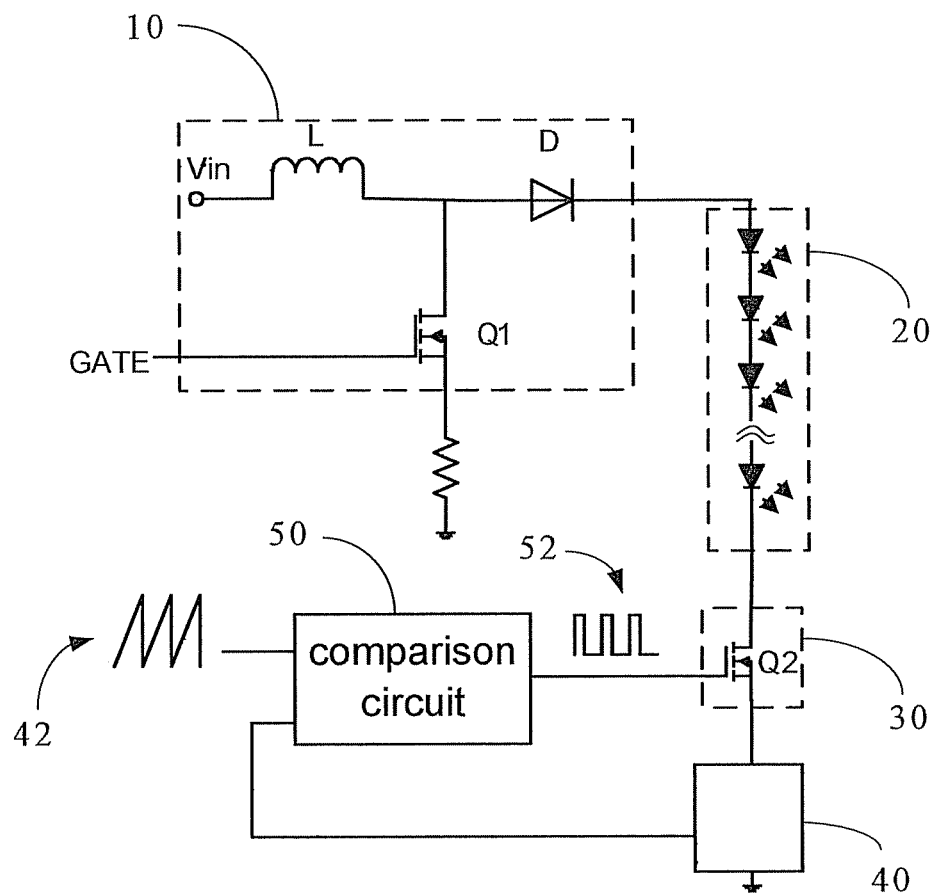
FIG. 1 is a block diagram illustrating a prior art dimmable LED driving circuit.
Figure 2:
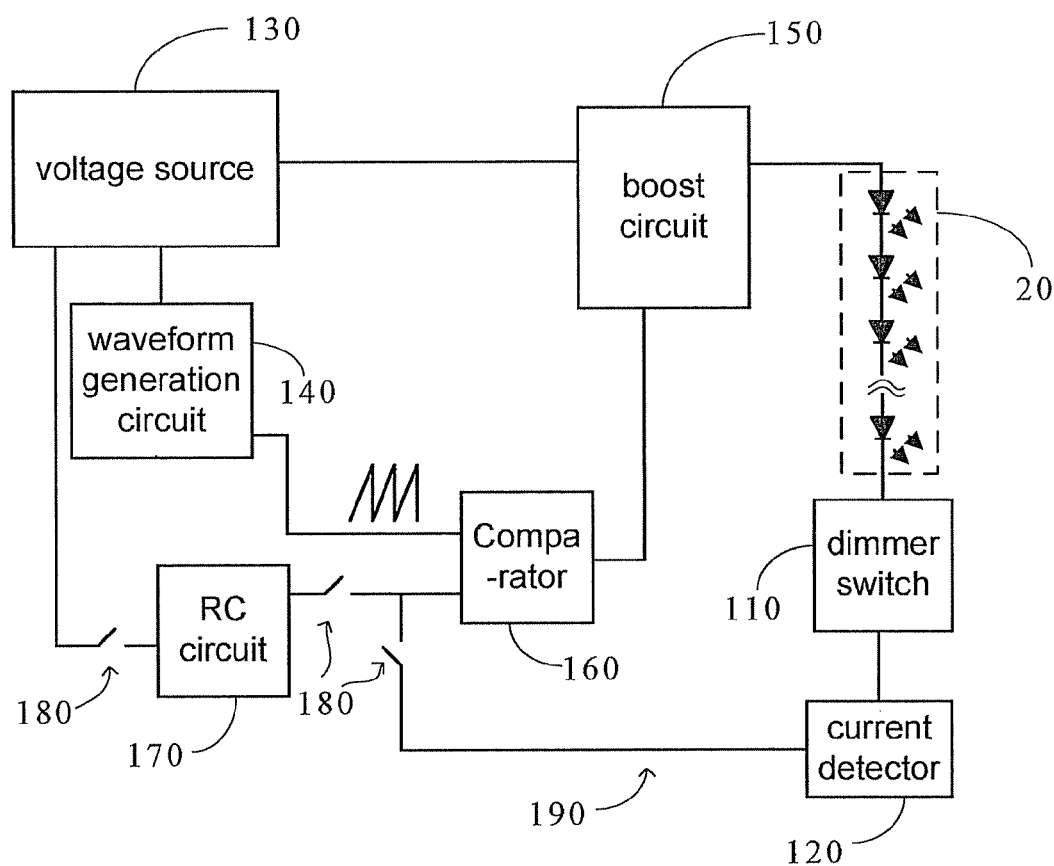
FIG. 2 is a block diagram illustrating a dimmable LED driving apparatus according to a preferred embodiment of the present invention.

Referring to FIG. 2, FIG. 2 is a block diagram illustrating a dimmable LED driving apparatus according to a preferred embodiment of the present invention. In order to explain clearly, the dimmable LED driving apparatus 100 of the embodiment is utilized to drive one single LED series 20, but actually there may be multiple LED series. The dimmable LED driving apparatus 100 of the embodiment basically includes a dimmer switch 110, a current detector 120, a voltage source 130, waveform generation circuit 140, a boost circuit 150, a comparator 160, a RC circuit 170, a switching circuit 180, and a feedback circuit 190.

As shown in FIG. 2, the voltage source 130 respectively provides the boost circuit 150, the waveform generation circuit 140 and the RC circuit 170 with electric power as desired. The boost circuit 150 converts the voltage, which is provided form the voltage source 130, into a suitable voltage to serve as a desired electric power for the lighting of the LED series 20. The boost circuit 150 which is electrically coupled to the LED series 20 is utilized to provide the LED series 20 with suitable direct current (DC) voltage/current.

The dimmer switch 110 is utilized to control connection or disconnection of then LED series 20. The current detector 120 is utilized to detect the current/voltage that pass through the LED series 20. The current detector 120 is coupled to the comparator 160 via the feedback circuit 190. The current detector 120 is utilized to provide the comparator 160 with the voltage signal passing through the LED series 20.

The comparator 160 further receives a triangle wave, otherwise known as sawtooth wave, which is generated from the waveform generation circuit 140. The triangle wave is compared with the voltage signal passing through the LED series 20. Moreover, the comparator 160 further electrically coupled to the boost circuit 150. The comparator 160 receives the triangle wave signal to generate a Pulse Width Modulation (PWM) signal. The PWM signal controlling the boost circuit 150, thereby changing the voltage which is outputted to the LED series 20.

Figure 3:
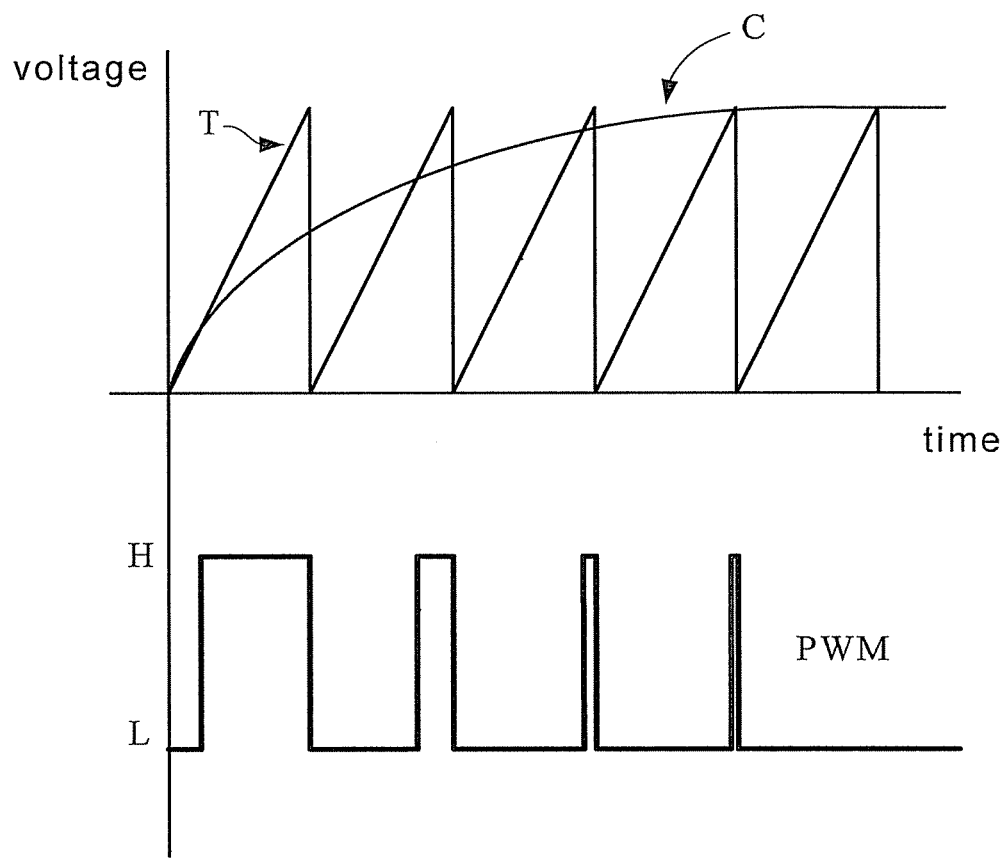
FIG. 3 is a schematic drawing illustrating waveforms of a triangle wave signal, a charging curve signal, and a PWM signal according to the embodiment.

Referring to FIG. 2 and FIG. 3, FIG. 3 is a schematic drawing illustrating waveforms of a triangle wave signal, a charging curve signal, and a PWM signal according to the embodiment. As shown in FIG. 2, the RC circuit 170 is electrically coupled to the comparator 160. When the dimmer switch disconnects, the RC circuit 170 is utilized to output a charging curve signal to the comparator 160. As shown in FIG. 3, the horizontal axis herein is time; the vertical axis herein is voltage; C indicates the charging curve signal; and T indicates the triangle wave signal. The comparator 160 generates the PWM signal with the diminishing duty cycles by comparing the charging curve signal C and the triangle wave signal. More specifically, the comparator 160 compares the values between the charging curve signal C and the triangle wave signal T. When the voltage of the triangle wave signal T is larger than the voltage of the charging curve signal C, an output terminal of the comparator 160 outputs a high level H. When the voltage of the triangle wave signal T is less than the voltage of the charging curve signal C, the output terminal of the comparator 160 outputs a low level L.

Therefore, when the dimmer switch 110 disconnects, the charging curve signal C is additionally provided for comparing with the triangle wave T, so that the PWM signal that controls the boost circuit does not become the low level immediately. Moreover, the boost circuit is driven in several cycles by the PWM signal with the diminishing duty cycles, so that the current of the inductor in the boost circuit 150 decreases slowly. Therefore, the dimmable LED driving apparatus 100 of the embodiment can solve the problem that the noise and the electromagnetic interference are generated when the LED series goes out immediately.

Figure 4:
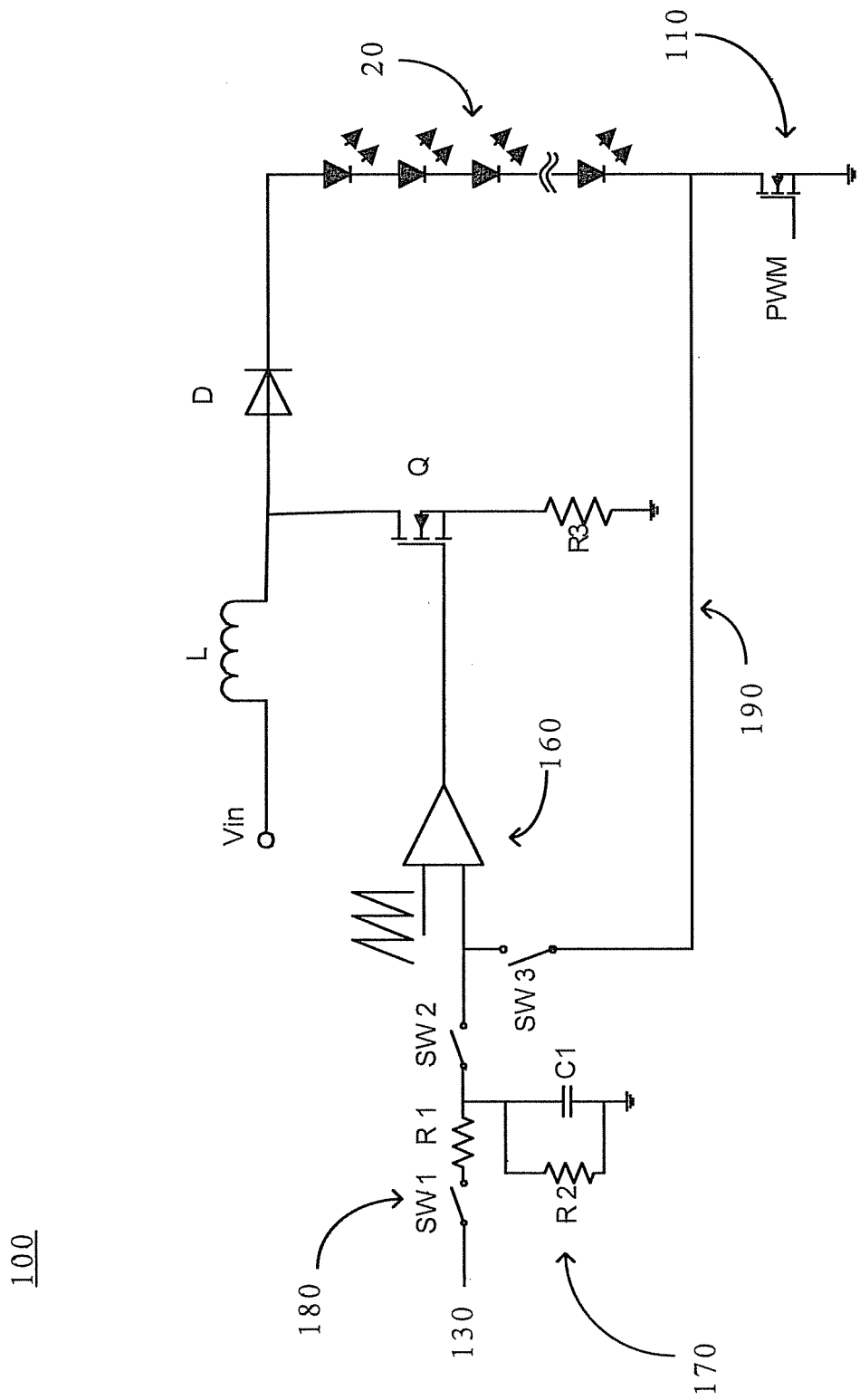
FIG. 4 is a schematic drawing illustrating a circuit of the dimmable LED driving apparatus of the embodiment.

The concrete circuit of the dimmable LED driving apparatus 100 in the embodiment will be explained in detail accompanying with FIG. 4 in the following. Referring to FIG. 3 and FIG. 4, FIG. 4 is a schematic drawing illustrating a circuit of the dimmable LED driving apparatus 100 of the embodiment. It should be noted that the schematic drawing does not depict a complete circuit for clarity. Parts of electronic components thereof are omitted.

As shown in FIG. 2 and FIG. 4, the switching circuit 180 of the dimmable LED driving apparatus 100 of the embodiment includes a first switch SW1, a second switch SW2 and a third switch SW3. In addition, the RC circuit 170 of the embodiment includes a capacitor C1 and a resistor R2. One terminal of the capacitor C1 is grounded; an opposite terminal thereof is coupled to the comparator 160. The resistor R2 is connected parallel to the capacitor C1. Moreover, the voltage source 130 is utilized to charge the capacitor C1. The feedback circuit 190 is utilized to couple the LED series 20 and to the comparator 160. Furthermore, the RC circuit 170 and the feedback circuit 190 are coupled to the same input terminal of the comparator 160. It is worth mentioning that the boost circuit 150 includes a field effect transistor Q, an inductor L, and a diode D. The gate of the field effect transistor Q is electrically coupled to the output terminal of the comparator 160, and the field effect transistor Q is utilized to turn on or turn off according to high or low of the PWM signal.

Referring to FIG. 4, the switching circuit 180 is utilized to turn off the connection between the RC circuit 170 and the comparator 160 when the dimmer switch 110 connects. Specifically, when the dimmer switch 110 is in an ON state, the first switch SW1 and the second switch SW2 disconnect. The capacitor C1 discharges toward the resistor R2, and the third switch SW3 closes. That is to say, when the switching circuit 110 turns off the connection between the RC circuit 170 and the comparator, the switching circuit 190 connects the feedback circuit 190. Under this condition, the LED series 20 is in a normal lighting duration.

On the other hand, the switching circuit 180 is further utilized to turn on the connection between the RC circuit 170 and the comparator 160 when the dimmer switch 110 disconnects, so that the comparator 160 receives the charging curve signal C.

When the dimmer switch 110 is in an OFF state, the first switch SW1 and the second switch SW2 close, and the third switch SW3 disconnect. Meanwhile, one of receiving terminals of the comparator 160 detects the voltage of the capacitor C1, and the voltage source 130 charges the capacitor C1 via a divided voltage of the resistor R1. The voltage of the capacitor C1 (as shown in FIG. 3) exponential grows and gradually approaches to a constant. The comparator 160 compares the charging curve signal C of the capacitor C1 with the triangle wave signal T, and the output terminal of the comparator 160 outputs the PWM signal with smaller and smaller duty cycles, which serves as a gate signal of the field effect transistor Q, so that the current passing through the inductor L gradually decreases. Finally, the field effect transistor Q is turned off.

Figure 5:
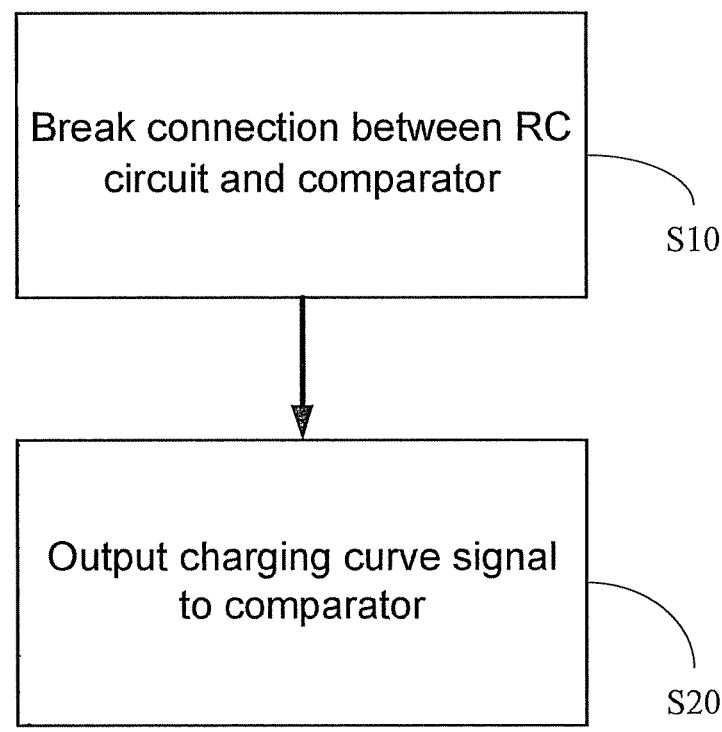
FIG. 5 is a flow chart illustrating a driving method a dimmable LED according to the preferred embodiment of the present invention.

A driving method of the present invention which employs the dimmable LED driving apparatus 100 of the embodiment will be explained in the following. Referring to FIG. 5, FIG. 5 is a flow chart illustrating a driving method a dimmable LED according to the preferred embodiment of the present invention. The driving method for a dimmable LED of the present invention employs a dimmable LED driving apparatus 100, which includes a dimmer switch 110. The dimmer switch 110 controls connection or disconnection of an LED series 20. The dimmable LED driving apparatus further includes: a boost circuit 150 which is electrically coupled to the LED series; a comparator 160 which is electrically coupled to the boost circuit 150, the comparator 160 receiving a triangle wave signal T to generate a PWM signal, the PWM signal controlling the boost circuit 150; and the RC circuit 170 which is electrically coupled to the comparator 160, the RC circuit 170 utilized to output a charging curve signal C to the comparator 160 when the dimmer switch 110 disconnects. The descriptions of the same elements in the method have been explained as above mention, so no further detail will be provided herein.

The method begins with step S10. At step S10, when the dimmer switch 110 controls the LED series 20 to connection, the connection between the RC circuit 170 and the comparator 160 is broken, so that the LED series 20 begin to radiate.

At step S20, when the dimmer switch 110 disconnects the LED series 20, the RC circuit 170 and the comparator 160 are connected, and the charging curve signal C is outputted to the comparator 160 for generating the PWM signal with the diminishing duty cycles.

In summary, when the dimmer switch 110 disconnects, the present invention additionally provides a charging curve signal C to the comparator 160 for comparing with the triangle wave T, so that the PWM signal that controls the boost circuit 150 does not immediately become the low level. On the contrary, the boost circuit 150 is driven in several cycles by the PWM signal with the diminishing duty cycles, so that the current of the inductor L in the boost circuit 150 decreases slowly, and the switch in the boost circuit 150 is then turned off. Therefore, the driving apparatus and method for a dimmable LED of the present invention can solve the problem that the noise and the electromagnetic interference are generated when the LED series goes out.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A dimmable light-emitting diode (LED) driving apparatus comprising a dimmer switch, which controls connection or disconnection of an LED series, the dimmable LED driving apparatus further comprising:
    a boost circuit electrically coupled to the LED series;
    a comparator electrically coupled to the boost circuit, the comparator receiving a triangle wave signal to generate a Pulse Width Modulation (PWM) signal, the PWM signal controlling the boost circuit;
    a resistor-capacitor (RC) circuit electrically coupled to the comparator, the RC circuit utilized to output a charging curve signal to the comparator for the comparator to generate the PWM signal with diminishing duty cycles when the dimmer switch disconnects; and
    a switching circuit utilized to turn on a connection between the RC circuit and the comparator when the dimmer switch disconnects, so that the comparator receives the charging curve signal.

2. The dimmable LED driving apparatus according to claim 1, wherein the comparator generates the PWM signal with the diminishing duty cycles by comparing the charging curve signal and the triangle wave signal.

3. The dimmable LED driving apparatus according to claim 1, wherein the switching circuit is utilized to turn off the connection between the RC circuit and the comparator when the dimmer switch connects.

4. The dimmable LED driving apparatus according to claim 1, wherein the dimmable LED driving apparatus further comprises a feedback circuit, and the feedback circuit is utilized to couple between the LED series to the comparator.

5. The dimmable LED driving apparatus according to claim 4, wherein when the switching circuit turns off the connection between the RC circuit and the comparator, the switching circuit connects the feedback circuit.

6. The dimmable LED driving apparatus according to claim 4, wherein the RC circuit and the feedback circuit are coupled to a same input terminal of the comparator.

7. The dimmable LED driving apparatus according to claim 1, wherein the RC circuit comprises a capacitor, one terminal of the capacitor grounded, an opposite terminal thereof coupled to the comparator; and a resistor connected parallel to the capacitor.

8. The dimmable LED driving apparatus according to claim 7, wherein the dimmable LED driving apparatus further comprises a voltage source, and the voltage source is utilized to charge the capacitor.

* * * * *